US012194606B2

(12) United States Patent
Kawamata et al.

(10) Patent No.: US 12,194,606 B2
(45) Date of Patent: Jan. 14, 2025

(54) WORKING MACHINE

(71) Applicant: Koki Holdings Co., Ltd., Tokyo (JP)

(72) Inventors: Takashi Kawamata, Ibaraki (JP); Masahiro Miura, Ibaraki (JP); Kazuhiro Ootsuka, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 18/546,653

(22) PCT Filed: Dec. 24, 2021

(86) PCT No.: PCT/JP2021/048091

§ 371 (c)(1),
(2) Date: Aug. 16, 2023

(87) PCT Pub. No.: WO2022/209078

PCT Pub. Date: Oct. 6, 2022

(65) Prior Publication Data

US 2024/0139922 A1 May 2, 2024

(30) Foreign Application Priority Data

Mar. 31, 2021 (JP) ................................ 2021-060793

(51) Int. Cl.
*B25C 1/04* (2006.01)
*B25C 1/00* (2006.01)

(52) U.S. Cl.
CPC ................ *B25C 1/001* (2013.01); *B25C 1/04* (2013.01)

(58) Field of Classification Search
CPC .............. B25C 1/001; B25C 1/04; B25C 7/00
(Continued)

(56) References Cited

U.S. PATENT DOCUMENTS 3,099,837 A * 8/1963 Heilman ................. B25C 1/005 227/112
4,129,240 A * 12/1978 Geist ......................... B25C 1/06 227/8
(Continued)

FOREIGN PATENT DOCUMENTS

AU 2022256196 A1 * 11/2022 ............. B25C 1/041
JP S59-019279 U1 2/1984
(Continued)

OTHER PUBLICATIONS

International Search Report issued in corresponding International Application No. PCT/JP2021/048091 dated Mar. 8, 2022 w/ English Translation (4 pages).

*Primary Examiner* — Robert F Long
(74) *Attorney, Agent, or Firm* — Rimon P.C.

(57) ABSTRACT

Provided is a working machine with improved durability. A nail driver (working machine) includes a hitting portion that is formed in a rod shape extending about an axis line, an injection portion that abuts on an outer peripheral surface of the hitting portion, thereby guiding a movement of the hitting portion toward one side in the axial direction, and a supply portion that energizes a fastener toward one side in a direction intersecting with the axial direction, thereby supplying the fastener to the injection portion. The hitting portion has a tip part, and a center part provided at a position different from that of the tip part in the axial direction. At least a part of an outer peripheral surface of the tip part (tip part outer peripheral surface) on an anti-feeder side with respect to the axis line protrudes from an outer peripheral surface of the center part (center par outer peripheral surface) on a supply portion side with respect to the axis line.

6 Claims, 19 Drawing Sheets

(58) Field of Classification Search
USPC ......... 227/1–2, 8–19, 51, 63–64, 77–82, 99, 227/107, 120, 130, 140, 156
See application file for complete search history.

(56) References Cited

U.S. PATENT DOCUMENTS

| | | | | | |
|---|---|---|---|---|---|
| 4,197,974 | A * | 4/1980 | Morton | B25C 1/04 227/8 |
| 4,323,127 | A * | 4/1982 | Cunningham | B25C 1/06 124/78 |
| 4,951,757 | A * | 8/1990 | Hamada | B25D 9/12 91/277 |
| 5,181,450 | A * | 1/1993 | Monacelli | F15B 15/261 173/127 |
| 5,322,136 | A * | 6/1994 | Bui | E21B 4/14 173/110 |
| 6,082,536 | A | 7/2000 | Ito et al. | |
| 2009/0272782 | A1* | 11/2009 | Johnson | B25B 21/00 227/130 |
| 2011/0198381 | A1* | 8/2011 | McCardle | B25C 1/06 227/8 |
| 2012/0118597 | A1* | 5/2012 | Hauptmann | B25D 17/06 173/126 |
| 2014/0262406 | A1* | 9/2014 | Moore | B25D 9/20 173/208 |
| 2016/0368128 | A1* | 12/2016 | Uchiyama | F16K 17/048 |
| 2017/0001291 | A1* | 1/2017 | Schnell | B25C 1/00 |
| 2018/0163366 | A1* | 6/2018 | Park | E02F 3/966 |
| 2022/0063074 | A1* | 3/2022 | Wierzchon | B25C 1/048 |
| 2022/0176532 | A1 | 6/2022 | Nakajima et al. | |
| 2023/0122029 | A1* | 4/2023 | Bierdeman | B25C 1/047 227/130 |

FOREIGN PATENT DOCUMENTS

| | | | | | |
|---|---|---|---|---|---|
| JP | H11-216686 | A | | 8/1999 | |
| JP | 11285988 | A | * | 10/1999 | |
| JP | H11-285988 | A | | 10/1999 | |
| JP | 2005-205563 | A | | 8/2005 | |
| JP | 2019198943 | A | * | 11/2019 | |
| JP | 2020-196067 | A | | 12/2020 | |
| JP | 2021154470 | A | * | 10/2021 | |
| JP | 2023066961 | A | * | 1/2024 | B25C 1/001 |
| WO | WO-2024154539 | A1 | * | 10/1999 | |
| WO | WO-2016174995 | A1 | * | 11/2016 | B25C 1/04 |
| WO | 2021/020364 | A1 | | 2/2021 | |
| WO | WO-2024090434 | A1 | * | 5/2024 | |
| WO | WO-2024004468 | A1 | * | 7/2024 | |

* cited by examiner

WORKING MACHINE

CROSS REFERENCE TO RELATED APPLICATIONS

This application is the U.S. National Phase under 35 U.S.C. § 371 of International Application No. PCT/JP2021/048091, filed on Dec. 24, 2021, which claims the benefit of Japanese Application No. 2021-060793, filed on Mar. 31, 2021, and the entire contents of each are hereby incorporated by reference.

TECHNICAL FIELD

The present invention relates to a working machine such as a nail driver.

BACKGROUND ART

Known as one example of a working machine has been a nail driver that hits a fastener by driving a piston with compressed air. Patent Document 1 discloses a nail driver in which a driver blade attached to a piston moves downward while being guided by a nose and hits a fastener.

RELATED ART DOCUMENTS

Patent Documents

Patent Document 1: Japanese Patent Application Laid-open No. 2020-196067

SUMMARY OF THE INVENTION

Problems to be Solved by the Invention

In the nail driver disclosed in Patent Document 1, the driver blade and the nose slides at a high speed, so that heat is generated and an altered layer is formed on a surface of the driver blade. Since this altered layer is hard and brittle, it is likely to cause microcracks due to an impact or the like at a striking time. As a result, the driver blade may be damaged by beginning at the microcracks, and it is desired to improve durability of the driver blade.

Meanwhile, it is conceivable to change a shape of the driver blade in order to suppress generation of the altered layer. However, in this case, it is necessary to consider a relationship between the driver blade and a sliding part other than the nose such as a nail and consider a structure of the driver blade that is less likely to be damaged if it is subjected to an impact at the striking time.

An object of the present invention is to provide a working machine with improved durability.

Means for Solving the Problems

A working machine according to one embodiment includes: a hitting portion formed in a rod shape that extends about an axis line and moves to one side in an axial direction to hit a fastener; an injection portion contacting with an outer peripheral surface of the hitting portion, thereby guiding a movement to the one side of the hitting portion in the axial direction; and a supply portion energizing the fastener on one side in a direction orthogonal to the axial direction, thereby supplying the fastener to the injection portion. The hitting portion has a first part and a second part provided at a position different from that of the first part in the axial direction. An outer peripheral surface of the first part on a supply portion side with respect to the axis line does not protrude from an outer peripheral surface of the second part on the supply portion side with respect to the axis line, and at least a part of an outer peripheral surface of the first part on an opposite side to the supply portion side with respect to the axis line protrudes from an outer peripheral surface of the second part on an opposite side to the supply portion side with respect to the axis line.

Effects of the Invention

According to the present invention, durability of the working machine can be improved.

DETAILED DESCRIPTION OF PREFERRED EMBODIMENTS

Figure 1:
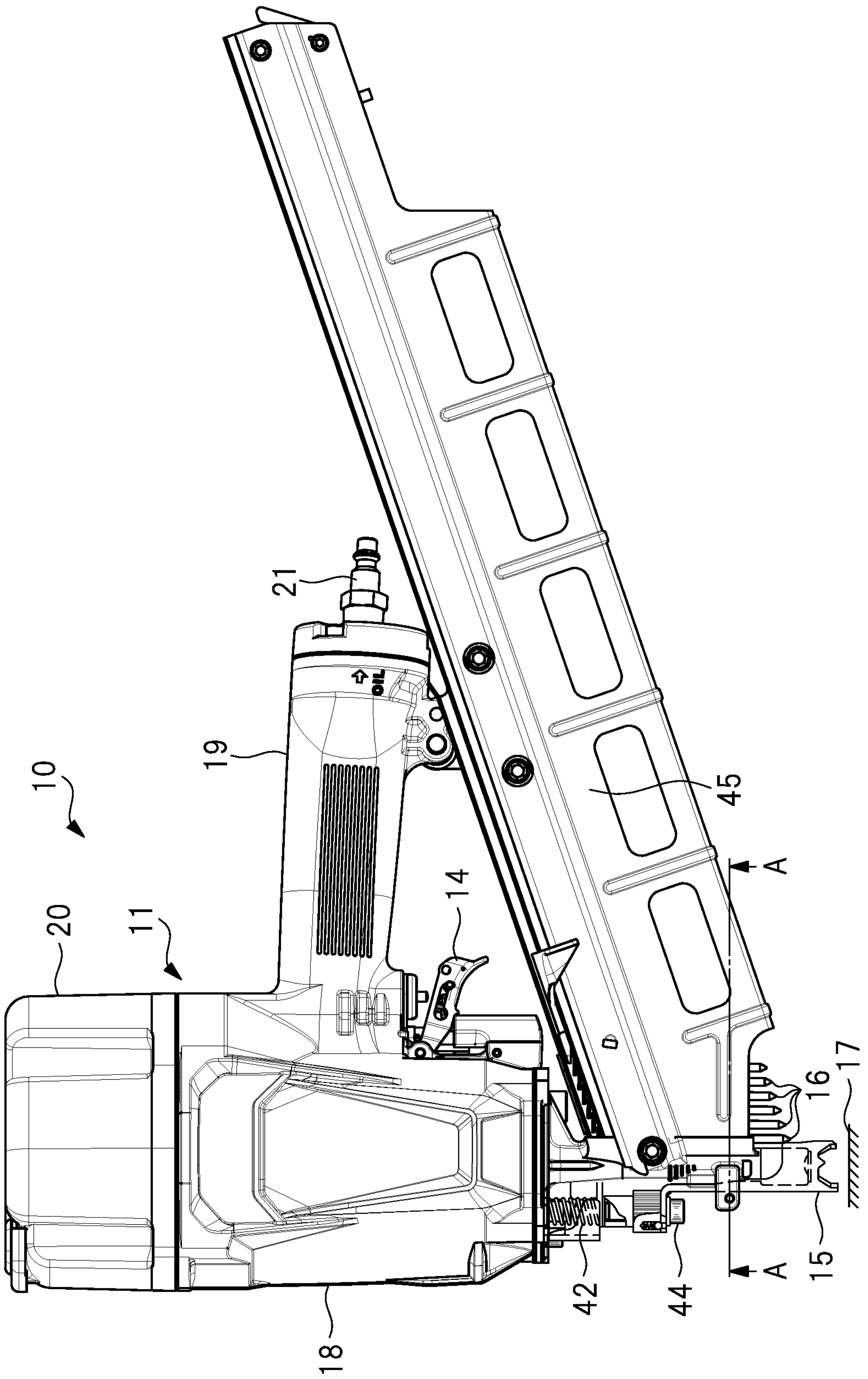
FIG. 1 is an outline view showing a nail driver which is one example of a working machine according to an embodiment of the present invention.

A working machine according to the present embodiment will be described with reference to the drawings. In this embodiment, a nail driver will be picked up and described as an example of a working machine. Incidentally, the same or equivalent elements shown in each figure are denoted the same reference numerals.

Figure 2:
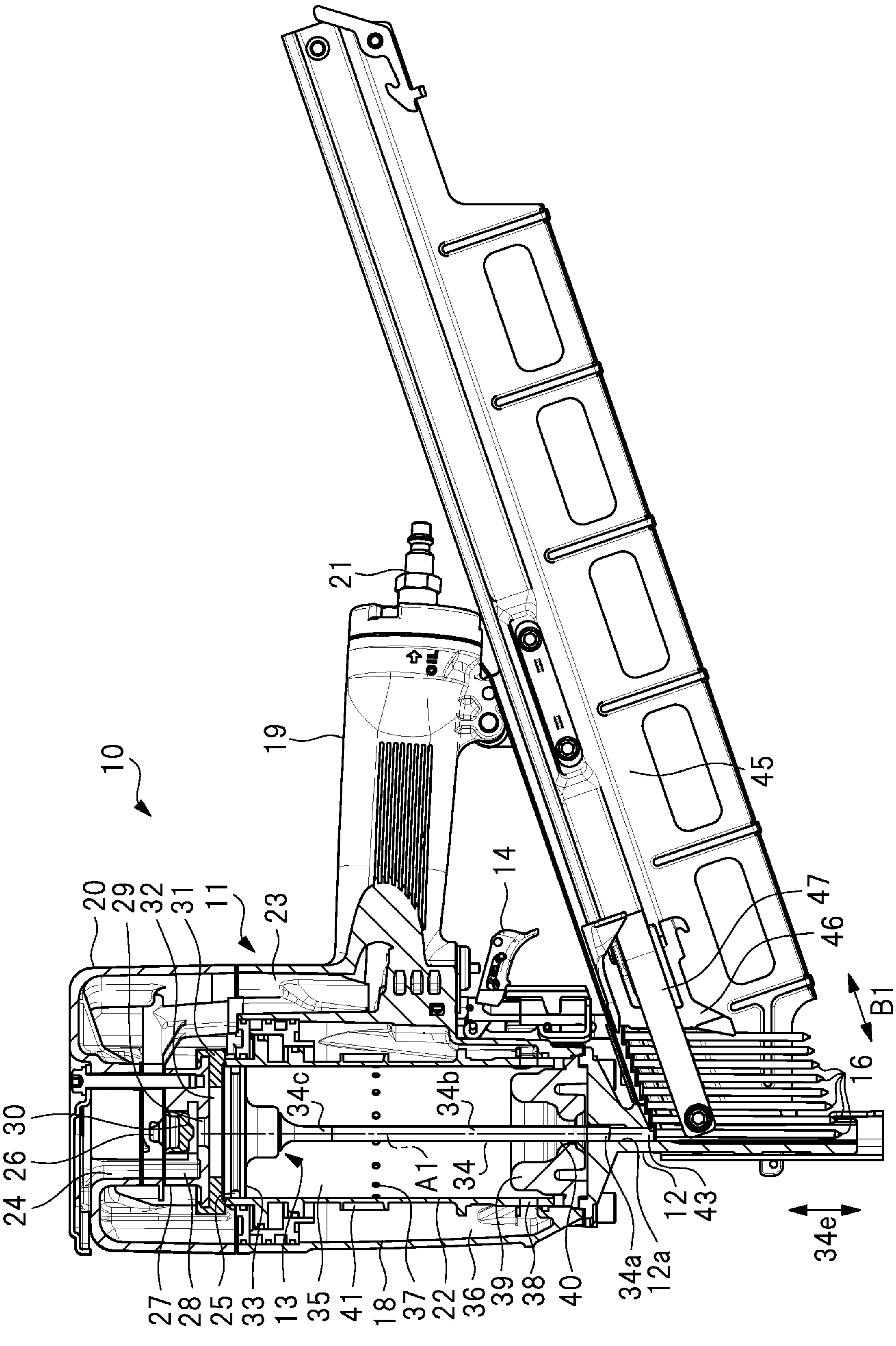
FIG. 2 is a sectional view of the nail driver shown in FIG. 1 at a position of a top dead center.

A nail driver 10 according to a first embodiment shown in FIGS. 1 and 2 has a housing 11, an injection portion 12, a hitting portion 13, a trigger 14, and a push lever 15. The housing 11 has a body part 18, a handle 19, and a head cover 20. The body part 18 has a cylindrical shape, and the handle 19 is connected to the body part 18. The head cover 20 is fixed to one end in a longitudinal direction of the body part 18 and closes an opening of the body part 18. Further, the injection portion 12 is called a nose and is fixed to the other end in the longitudinal direction of the body part 18. Then, a plug 21 is provided on the handle 19, and an air hose is connected to the plug 21.

A cylinder 22 is provided inside the body part 18. The cylinder 22 is movable relative to the housing 11 in a direction along a center line A1. The center line A1 is a center line of the cylinder 22. The hitting portion 13 is arranged over inside and outside the cylinder 22. The hitting portion 13 is slidable with respect to the cylinder 22 in the direction along the center line A1. An accumulator 23 is provided everywhere in the handle 19, the body part 18, and a head cover 20. Compressed air supplied from the air hose is accumulated in the accumulator 23.

Further, the head cover 20 also has a passage 24 and an exhaust valve chamber 26. The passage 24 is connected to an outside of the housing 11. Furthermore, a mount portion 27 is attached to the head cover 20. The mount portion 27 has a passage 28 and a passage 29. The passage 29 is connected to the passage 24 via the passage 28. The mount portion 27 supports an exhaust valve 30. The exhaust valve 30 is movable relative to the mount portion 27 in the direction along the center line A1. When the exhaust valve 30 operates, the passage 29 is opened and closed.

A valve seat 31 is attached to the mount portion 27. The valve seat 31 is made of synthetic rubber and has a piston upper chamber 32. The piston upper chamber 32 communicates with the passage 29.

Incidentally, the hitting portion 13 has a piston 33 and a driver blade 34. The piston 33 is provided in the cylinder 22 and is operable relative to cylinder 22 in the direction along center line A1. The piston 33 is energized in the direction along the center line A1 and in a direction of separating from the valve seat 31 due to pressure in the piston upper chamber 32. A seal member 25 is attached to an outer peripheral surface of the piston 33. The seal member 25 contacts with an inner peripheral surface of the cylinder 22. The driver blade 34 attached to the piston 33 is a member that moves to one side (fastener projecting side) in an axis-line direction 34*e* of FIG. 1 to hit nails (fasteners) 16, the axis-line direction being a direction along an axis line 34*d* of the driver blade 34 shown in FIG. 3.

As shown in FIG. 1, a piston lower chamber 35 is provided between the piston 33 and the injection portion 12 in the direction along the center line A1 inside the cylinder 22. The seal member 25 seals the piston lower chamber 35. Further, a return air chamber 36 is provided between the body part 18 and the cylinder 22. Then, passages 37, 38 are provided so as to penetrate the cylinder 22 in a radial direction. Furthermore, a check valve 41 is provided on the outer peripheral surface of the cylinder 22. The check valve 41 is actuated by the pressure inside the cylinder 22 and opens/closes the passage 37. The passage 38 always connects the lower piston chamber 35 and the return air chamber 36. The passage 38 is arranged between the passage 37 and the injection portion 12 in the direction along the centerline A1.

Also, a bumper 39 is provided inside the cylinder 22. The bumper 39 is arranged in the cylinder 22 at a position closest to the injection portion 12 in the direction of the center line A1. The bumper 39 is made of synthetic rubber or silicone rubber. Further, the bumper 39 has an axial hole 40, and the driver blade 34 can move in the axial hole 40 in the direction of the center line A1. Then, the piston lower chamber 35 is formed between the piston 33 and the bumper 39 in the cylinder 22.

Further, the injection portion 12 is fixed to the body part 18 and has an injection path 43. The injection path 43 is connected to the axial hole 40. The driver blade 34 is movable in the axial hole 40 and the injection path 43 in the direction along the center line A1. Then, the injection portion 12 contacts with the outer peripheral surface 34*f* of the driver blade 34 shown in FIG. 3, thereby guiding movement of the driver blade 34 to one side (fastener projecting side) in the axis direction 34*e* of the driver blade 34.

Furthermore, the push lever 15 is attached to the injection portion 12. The push lever 15 is operable with respect to the housing 11 and the injection portion 12 in the direction along the center line A1. The push lever 15 is energized by a spring 42 as an energization member in a direction of separating from the housing 11. The push lever 15 energized by the spring 42 contacts with a stopper 44 and stops at an initial position. When a tip of the push lever 15 is pressed against a workpiece 17, the push lever 15 is operable in a direction of approaching the housing 11 against an energization force of the spring 42.

In addition, a magazine 45 is attached to the nail driver 10. The magazine 45 can accommodate a plurality of nails 16 as fasteners. A magazine 45 is supported by the injection portion 12 and the handle 19. The magazine 45 is provided with a feeder 46 as a supply portion for the nails 16 and a spring 47. The spring 47 energizes the nail 16 on one side in a direction (hereinafter, this direction is also referred to as an energization direction B1) intersecting with the axis direction 34*e* of the driver blade 34 via the feeder 46. That is, the feeder 46 feeds the nail 16 to the injection path 43 by an energizing force of the spring 47.

Next, an example of an operation of the nail driver 10 in using the nailing driver 10 to driving the nail 16 into the workpiece 17 will be described. As shown in FIG. 1, when a user applies an operating force to the trigger 14 and operates so as to push the push lever 15 against the workpiece 17, the pressure in the accumulator 23 shown in FIG. 2 is transmitted to the piston upper chamber 32 and the piston 33 and the driver blade 34 descend. Then, the driver blade 34 hits the nail 16. The hit nail 163 is driven into the workpiece 17.

Figure 6:
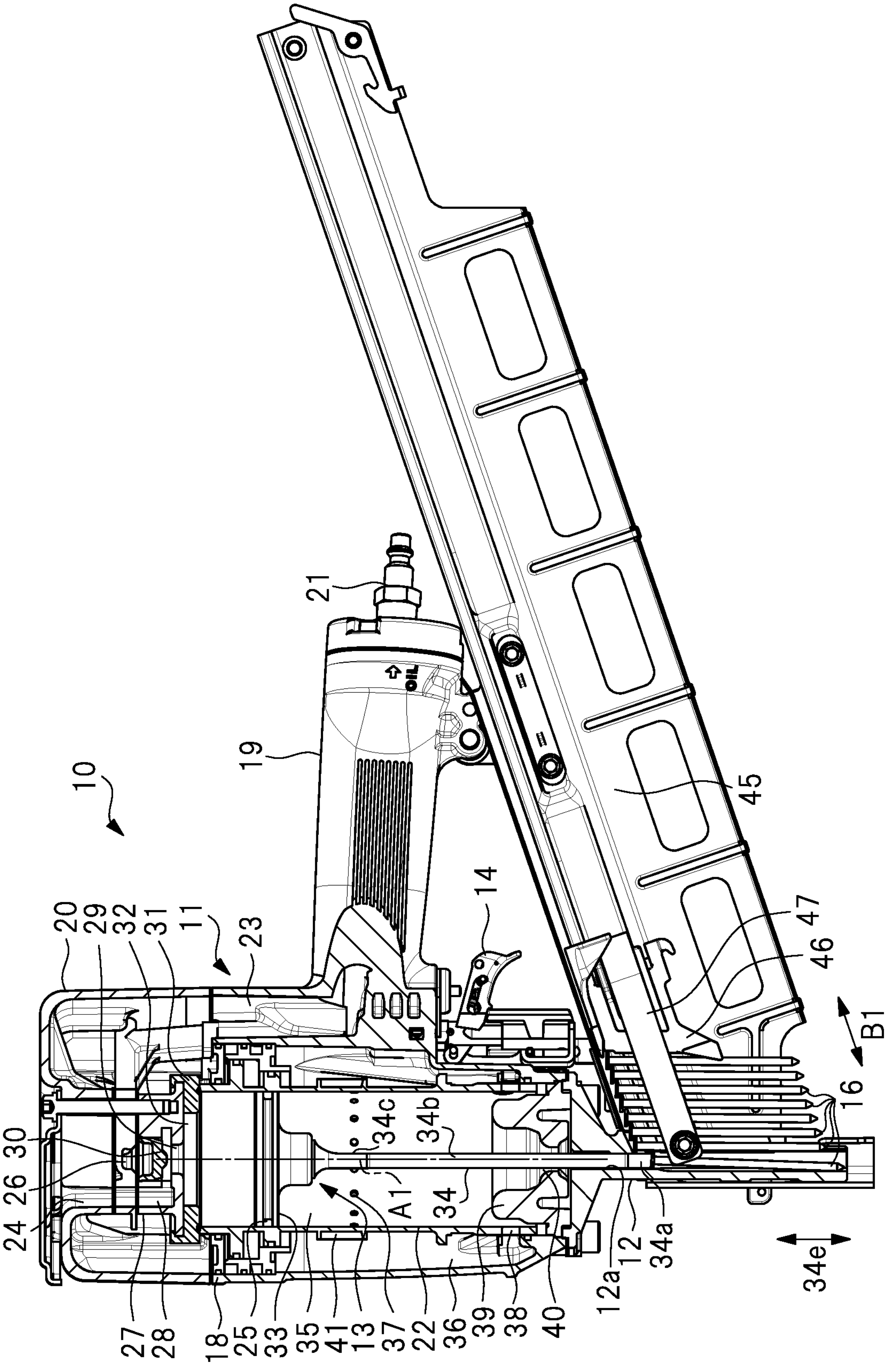
FIG. 6 is a sectional view of the nail driver shown in FIG. 1 at a position between the top dead center and a bottom dead center.
Figure 7:
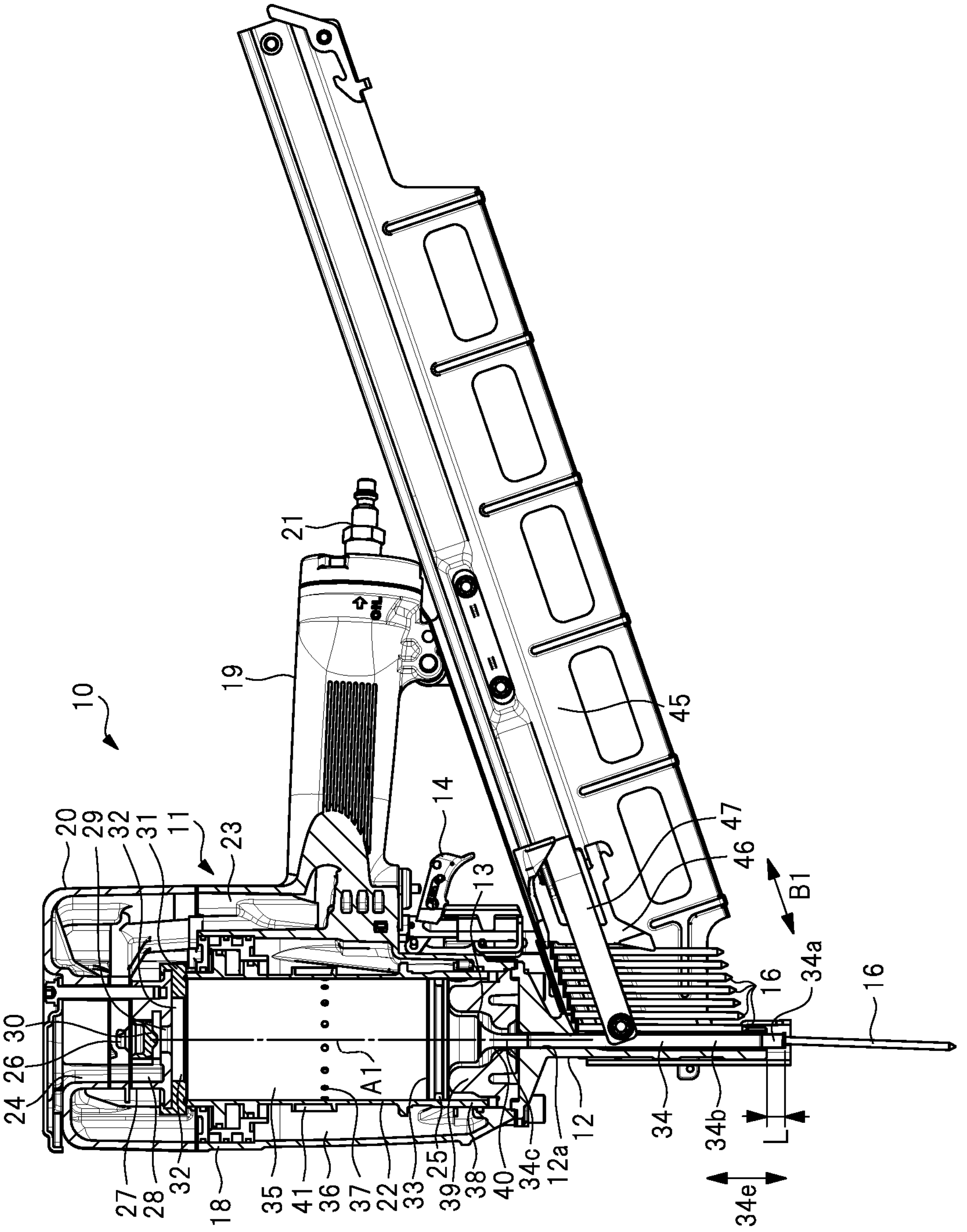
FIG. 7 is a sectional view of the nail driver shown in FIG. 1 at a bottom dead center position.

Incidentally, as shown in FIG. 6, when the seal member 25 moves between the passage 37 and the bumper 39 while the hitting portion 13 is descending, the check valve 41 is actuated by pressure of the compressed air flowing into the cylinder 22 to open the passage 37. Therefore, a portion of the compressed air in the cylinder 22 flows through the passage 37 into the return air chamber 36. Consequently, as shown in FIG. 7, when the hitting portion 13 descends and the piston 33 collides with the bumper 39, the bumper 39 absorbs part of kinetic energy of the hitting portion 13. Also, the hitting portion 13 stops at a bottom dead center. When the hitting portion 13 stops at the bottom dead center, the piston 33 is pressed against the bumper 39 and blocks the inside of the cylinder 22 and the axial hole 40.

When the push lever 15 is separated from the workpiece 17 by a recoil resulting from the hitting portion 13 striking the nail 16 into the workpiece 17, the push lever 15 is actuated by the energizing force of the spring 42 and stops at an initial position. Consequently, the compressed air in the exhaust valve chamber 26 is discharged exteriorly. Furthermore, the exhaust valve 30 operates to connect the passage 29 and the passage 28, and the compressed air in the piston upper chamber 32 is discharged exteriorly. When the pressure in the piston upper chamber 32 drops, the piston 33 rises due to the pressure of the compressed air supplied from the return air chamber 36 to the piston lower chamber 35. Then, the piston 33 contacts with the valve seat 31, and the hitting portion 13 stops at the top dead center.

Figure 3:
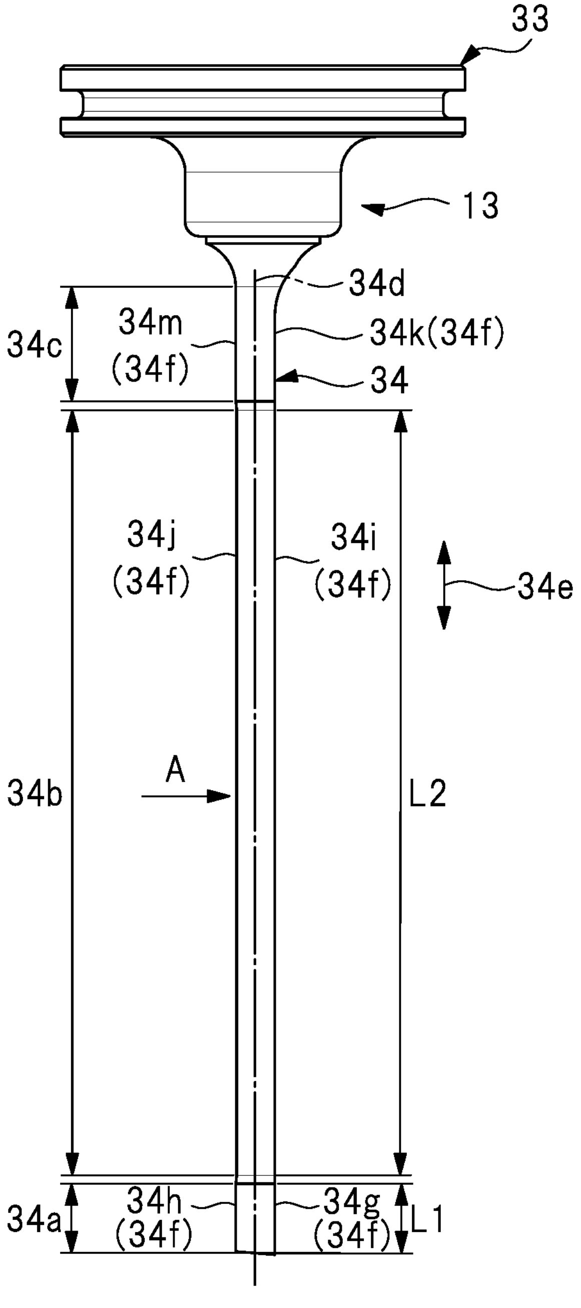
FIG. 3 is an outline view of a driver blade that the nail driver shown in FIG. 1 has.

Next, the driver blade 34 that the nail driver 10 of the present embodiment has will be described. As shown in FIG. 3, the driver blade 34 is a member that configures the hitting portion 13 together with the piston 33, and is formed like a rod extending about the axis line 34*d*. The driver blade 34 has a first part and a second part provided at a position different from that of the first part in the axial direction 34*e*. Further, the driver blade 34 has a third part provided at a position different from those of the first part and the second part in the axial direction 34*e*. That is, the driver blade 34 has the first part, the second part, and the third part that are provided at the different positions in the axial direction 34*e*.

Here, in the present embodiment, explained will be a case where the first part and the second part are provided on one side (fastener projecting side) of the axial direction 34*e* from the third part and further the first part is provided on one side (fastener projecting side) of the axial direction 34*e* from the second part. Specifically, the first part is a tip part 34*a* of the driver blade 34, the second part is a central part 34*b* thereof, and the third part is a root part 34*c* thereof. Therefore, the center part 34*b*, which is the second part, is located between the tip part 34*a*, which is the first part, and the root part 34*c*, which is the third part.

Figure 4A:
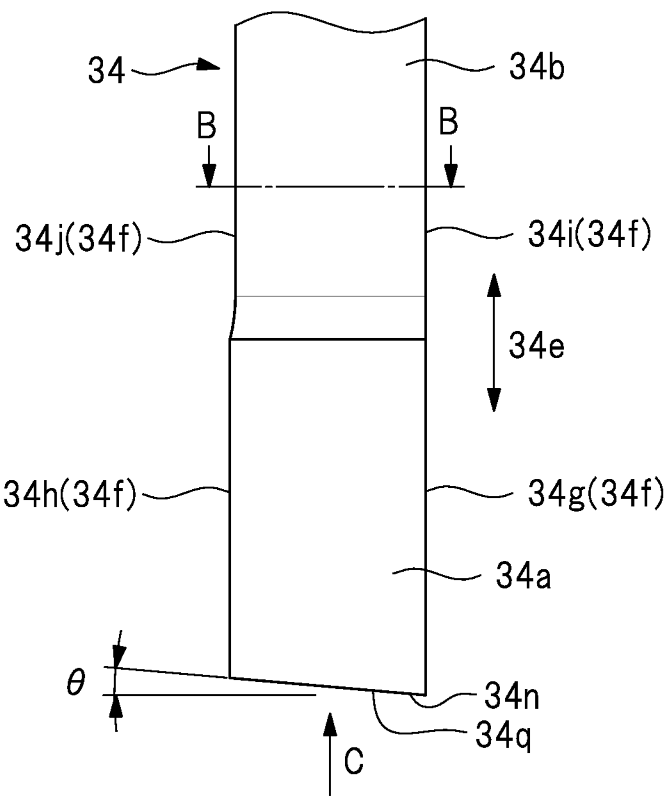
FIGS. 4A-4C are views showing a structure of the driver blade shown in FIG. 3, wherein 4A is a partially enlarged view of a tip portion, 4B is a sectional view taken along line B-B in 4A, and 4C is a C arrow view in 4A.
Figure 4B:
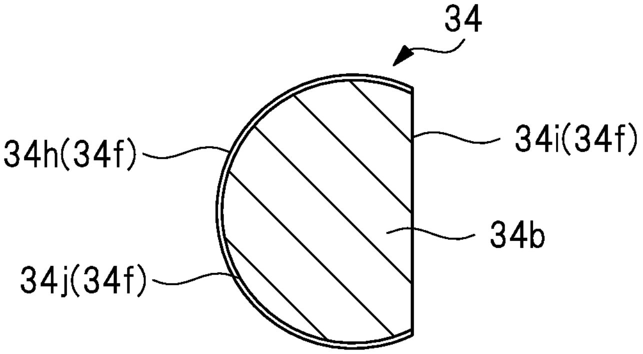
Figure 4C:
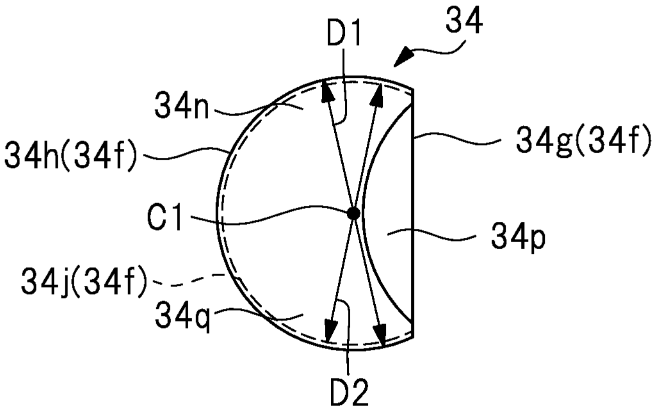

Moreover, in the driver blade 34, a tip part outer peripheral surface 34*g*, which is an outer peripheral surface 34*f* located on a feeder 46 side (see FIG. 2) with respect to the axis line 34*d* of the tip part 34*a*, does not protrude from a center part outer peripheral surface 34*i* that is an outer peripheral surface 34*f* on the feeder 46 side with respect to the axis line 34*d* of the center part 34*b*. In the driver blade 34 shown in FIG. 3, the tip part outer peripheral surface 34*g* and the center part outer peripheral surface 34*i* are flat surfaces having the same height as shown in FIGS. 4A and 4B. Further, a tip part outer peripheral surface 34*h*, which is the outer peripheral surface 34*f* located on an opposite side (hereinafter also referred to as anti-feeder side) of the feeder 46 with respect to the axis line 34*d* of the tip part 34*a*, protrudes from a center part outer peripheral surface 34*j*, which is an outer peripheral surface 34*f* on an anti-feeder side with respect to the axis line 34*d* of the center part 34*b*, as shown in FIGS. 4A and 4B. Incidentally, in the driver blade 34, at least a part of the tip part outer peripheral surface 34*h* may protrude from the center part outer peripheral surface 34*j* with respect to the axis line 34*d*. In the driver blade 34 of the present embodiment, a cross-sectional shape of the tip part 34*a* in the direction orthogonal to the axial direction 34*e* is configured by an arc shape and a straight line, as shown in FIG. 4B. That is, the tip part outer peripheral surface 34*h* of the tip part 34*a* on the anti-feeder side is an arc-shaped surface, while the tip part outer peripheral surface 34*g* of the tip part 34*a* on the ant-feeder 46 side is a flat surface. Similarly, the center part outer peripheral surface 34*j* of the center part 34*b* on the anti-feeder side is an arc-shaped surface, while the center part outer peripheral surface 34*i* of the center part 34*b* on the feeder 46 side is a flat surface. Therefore, in the driver blade 34, the tip part outer peripheral surface 34*h*, which is an arc-shaped surface on the anti-feeder side, protrudes from the center part outer peripheral surface 34*j* which is the same arc-shaped surface, with respect to the axis line 34*d*. Incidentally, shapes of cutting surfaces of the tip part 34*a* and the center part 34*b* in a direction perpendicular to the axial direction 34*e* are similar shapes. Specifically, a circle of the tip part 34*a*, which forms the arcuate outer peripheral surface 34*h* on the anti-feeder side, and a circle of the center part 34*b*, which forms the arcuate outer peripheral surface 34*j* on the anti-feeder side are circles mutually having the same center Cl, as shown in FIG. 4C. Further, the tip part outer peripheral surface 34*g* of the tip part 34*a* on the feeder 46 side and a center part outer peripheral surface 34*i* of the center part 34*b* on the feeder 46 side are flat surfaces having the same height. Therefore, the shapes of the cutting surfaces of the tip part 34*a* and the center part 34*b* in the direction perpendicular to the axial direction 34*e* are similar shapes.

Here, a protrusion amount of tip part outer peripheral surface 34*h* with respect to the center part outer peripheral surface 34*j* is preferably 0.05% or more and less than 0.5% with respect to a length L2 of the center part 34*b* in the axial direction 34*e* as shown in FIG. 4A. As one example, when the length L2 of the center part 34*b* of the driver blade 34 in the axial direction 34*e* is 105 mm, the protrusion amount of tip part outer peripheral surface 34*h* with respect to the center part outer peripheral surface 34*j* is about 0.05 mm to about 0.5 mm. As one example, as shown in FIG. 4C, a diameter D1 of the circle at the center Cl forming the tip part outer peripheral surface 34*h*, which is an arc-shaped surface, is 7.0 mm, and a diameter D2 of the circle of the center Cl forming the center part outer peripheral surface 34*j*, which is an arc-shaped surface, is 6.6 mm to 6.8 mm. In this case, the protrusion amount of tip part outer peripheral surface 34*h* with respect to the center part outer peripheral surface 34*j* is 0.1 mm to 0.2 mm, which falls within a range of about 0.05 mm to less than about 0.5 mm.

Further, in the driver blade 34, a root part outer peripheral surface 34*k*, which is an outer peripheral surface 34*f* located on the feeder 46 side with respect to the axis line 34*d* of the root part 34*c*, does not protrude from the center part outer peripheral surface 34*i*, which is the outer peripheral surface

34*f* on the feeder 46 side with respect to the axis line 34*d* of the center part 34*b*. Similarly to a relationship between the tip part 34*a* and the center part 34*b*, in the driver blade 34 shown in FIG. 3, the root part outer peripheral surface 34*k* and the center part outer peripheral surface 34*i* are flat surfaces having the same height. Furthermore, the root part outer peripheral surface 34*m*, which is the outer peripheral surface 34*f* positioned on the anti-feeder side with respect to the axis line 34*d* of the root part 34*c*, protrudes from the center part outer peripheral surface 34*j*, which is the outer peripheral surface 34*f* on the anti-feeder side with respect to the axis line 34*d* of the center part 34*b*, similarly to the relationship between the tip part 34*a* and the center part 34*b*.

Incidentally, as with the tip part 34*a*, at least a portion of a root part outer peripheral surface 34*m* may protrude from the center part outer peripheral surface 34*j* with respect to the axis line 34*d*. In the driver blade 34 of the present embodiment, a cross-sectional shape of the root part 34*c* in a direction orthogonal to the axial direction 34*e* is also composed of an arc-like shape and a straight line, and is the same as the cross-sectional shape of the tip part 34*a*. That is, the root part outer peripheral surface 34*m*, which is the outer peripheral surface 34*f* of the root part 34*c*, is an arc-like surface. Therefore, also in the relationship between the root part 34*c* and the center part 34*b*, the root part outer peripheral surface 34*m*, which is an arc-shaped surface on the anti-feeder side, protrudes with respect to the axis line 34*d* from the center part outer peripheral surface 34*j*, which is the same arc-shaped surface.

As one example, a protrusion amount of root part outer peripheral surface 34*m* with respect to the center part outer peripheral surface 34*j* is also 0.1 mm to 0.2 mm.

As described above, in the driver blade 34 of the present embodiment, the outer peripheral surface 34*f* of the center part 34*b* on the anti-feeder side is recessed from the outer peripheral surfaces 34*f* of the tip part 34*a* and the root part 34*c* on the anti-feeder side. In other words, the outer peripheral surface 34*f* of the driver blade 34 on the anti-feeder side has a step, and the center part 34*b* is thinner than the tip part 34*a* and the root part 34*c*. However, on the feeder 46 side of the driver blade 34, a region from the root part 34*c* to the center part 34*b* and the tip part 34*a* has no step, and is a flat surface having the same height.

Here, in the driver blade 34 of the present embodiment, explained will be a reason why the outer peripheral surface 34*f* on the anti-feeder side has the step, that is, the outer peripheral surface 34*f* of the center part 34*b* on the anti-feeder side is recessed from the outer peripheral surfaces 34*f* of the tip part 34*a* and the root part 34*c* on the anti-feeder side.

Figure 5:
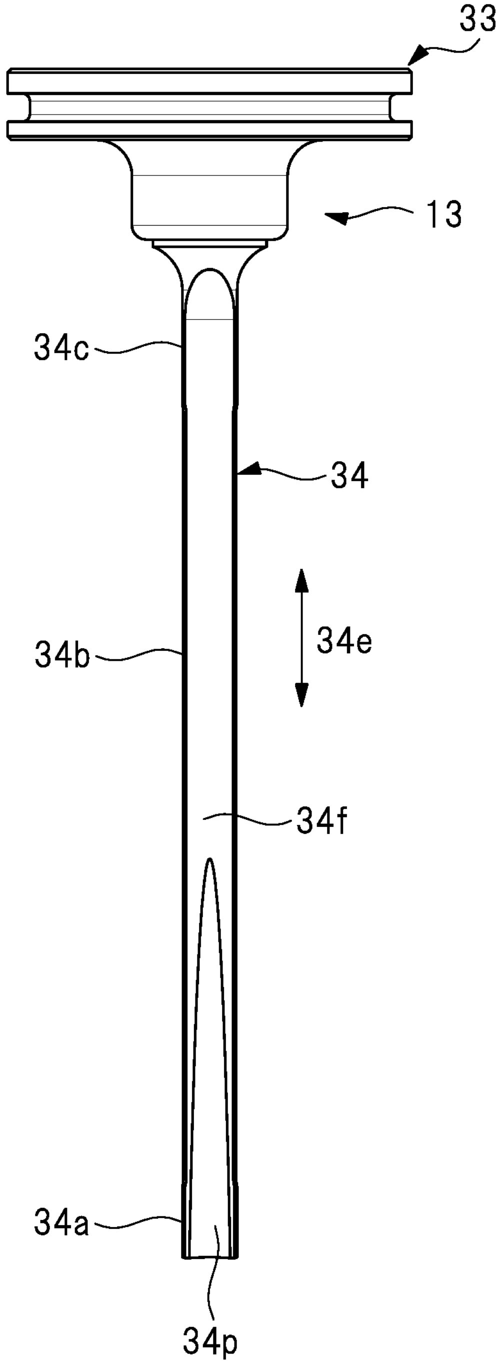
FIG. 5 is an outline view of the driver blade shown in FIG. 3 as viewed from a feeder side.

In the nail driver 10 of the present embodiment, as shown in FIG. 2, the feeder 46 always pushes the nails 16, which are accommodated in the magazine 45 along an energizing direction B1 intersecting with the axial direction 34*e*, into the hitting portion 13. Specifically, the feeder 46 presses another nail 16 against the hitting portion 13 along the energizing direction B1 intersecting with the axial direction 34*e* while the hitting portion 13 hits the nail 16. Consequently, the nail 16 to be next hit is pressed against the driver blade 34 by the feeder 46 even while the hitting portion 13 is moving to hit the nail 16. Then, as shown in FIGS. 4C and 5, the driver blade 34 is provided with a taper portion 34*p* toward a tip so as not to hit the waiting nail 16 to be next hit at the same time. However, since the waiting nail 16 is also pressed against the driver blade 34 by the feeder 46, the driver blade 34 is pressed on the anti-feeder side by a pressing force of the waiting nail 16 and moves on a protrusion side while abutting on an inner wall 12*a* of the injection portion 12. At this time, in the driver blade 34, the outer peripheral surfaces 34*f* of the tip part 34*a* and the root part 34*c* on the anti-feeder side protrude from the outer peripheral surface 34*f* of the central part 34*b* on the anti-feeder side, so that the outer peripheral surface 34*f* of the center part 34*b* on the anti-feeder side can avoids abutting on the inner wall 12*a* of the injection portion 12. In other words, since the outer peripheral surface 34*f* of the center part 34*b* on the anti-feeder side is recessed from the outer peripheral surfaces 34*f* of the tip part 34*a* and the root part 34*c* on the anti-feeder side, the outer peripheral surface 34*f* of the center part 34*b* on the anti-feeder side can avoid abutting on the inner wall 12*a* of the injection portion 12.

Therefore, the center part 34*b* of the driver blade 34 and the inner wall 12*a* of the injection portion 12 slide at a high speed and generate heat, thereby being capable of avoiding generation of the altered layer on the surface of the center part 34*b* of the driver blade 34. This makes it possible to prevent breakage at the center part 34*b* of the driver blade 34 to which a relatively large stress is applied. As a result, the durability of the driver blade 34 can be improved.

Further, the protrusion amount of tip part outer peripheral surface 34*h* with respect to the center part outer peripheral surface 34*j* is 0.05% or more and less than 0.5% with respect to the length L2 of the center part 34*b* of the driver blade 34, which can suppress a reduction in the durability of the driver blade 34 due to a reduction in the diameter D2 of the center part outer peripheral surface 34*j* while avoiding abutting on the driver blade 34*j* with the inner wall 12*a* of the injection portion 12 of the center part outer peripheral surface 34*j*.

In addition, in the driver blade 34, the feeder 46 side has no step everywhere from the root part 34*c* to the center part 34*b* and the tip part 34*a* and is the flat surface having the same height. In other words, the tip part outer peripheral surface 34*k* of the tip portion 34*a* on the feeder 46 side and the tip part outer peripheral surface 34*g* of the tip part 34*a* on the feeder 46 side do not protrude from the center part outer peripheral surface 34*i* of the center part 34*b* of the feeder 46 side. Then, the nails 16 are supplied from a magazine side. Therefore, since the feeder 46 side of the driver blade 34 is the flat surface, the nail can avoid being adversely influenced with respect to a driving operation of the driver blade 34 by vibration, the adverse influence being that a head of the nail 16 catches on the step of the driver blade 34 and the vibration thereby is caused. Incidentally, in order to make the driver blade 34 compatible with the existing nails 16, a shape of the tip part 34*a* needs to be shared with existing nail drivers to some extent, so that if an attempt is made to provide the step between the outer peripheral surface 34*f* of the center part 34*b* and the outer peripheral surface 34*f* of the center part 34*b*, the diameter of the center part 34*b* must be reduced. Here, if such a configuration is adopted that the tip part outer peripheral surface 34*h* on the anti-feeder 46 side protrudes from the center part outer peripheral surface 34*j* of the center part 34*b* on the anti-feeder 46 side and the tip part outer peripheral surface 34*g* on the feeder 46 side protrudes from the center part outer peripheral surface 34*i* of the center part 34*b* on the feeder 46 side, the diameter of the center part 34*b* becomes excessively small, so that the driver blade 34 may be easily damaged from the center part 34*b* regardless of the presence or absence of deterioration in the center part 34*b*. However, according to the driver blade 34 of the present embodiment, the tip part outer peripheral surface 34*g* on the feeder 46 side does not protrude from the center part outer peripheral surface 34*i* of the center part 34*b* on the feeder 46 side, and the diameter of the center part 34b is excessively small, so that the damage to the center part 34b can be suppressed.

Figure 8:
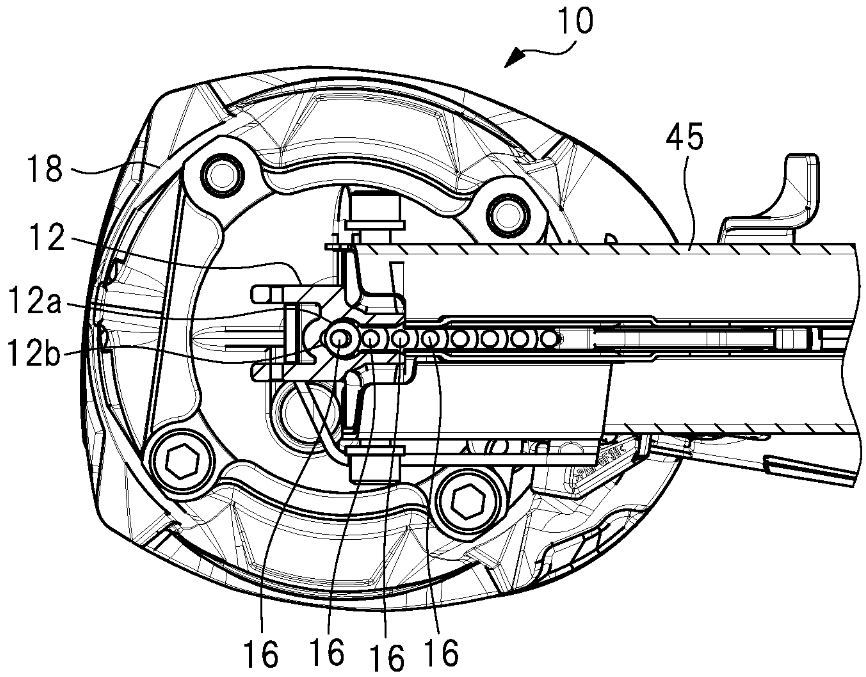
FIG. 8 is an enlarged partial sectional view showing a structure of the nail driver shown in FIG. 1 that is cut along line A-A.

Further, as shown in FIG. 4A, a lower end surface 34n of the driver blade 34 includes a hitting surface 34q for hitting the nail 16. Then, the hitting surface 34q is formed so as to be inclined with respect to the axis line 34d shown in FIG. 3 so that a lower end on the feeder 46 side protrudes from a lower end on the anti-feeder side toward one side (fastener projecting side) in the axial direction 34e. Incidentally, an inclination angle $\theta$ of the hitting surface 34q with respect to a direction orthogonal to the axial direction 34e is, for example, $\theta=5°$. In hitting the nail 16, the inclination angle of 5° of the hitting surface 34q is provided for inclining a tip of the nail 16 by 5° with respect to the axis line 34d shown in FIG. 3 in order to prevent a lateral displacement of the tip of the nail 16 and for moving the nail while abutting on the inner wall 12a of the injection portion 12. Specifically, as shown in FIG. 8, the inner wall 12a of the injection portion 12 is provided with a U-groove 12b recessed toward the anti-feeder side, and the nail 16 is moved while causing the tip of the nail 16 to abut on the U-groove 12b during movement in the injection portion 12. This makes it possible to drive the nail 16 into a desired position of the workpiece 17 shown in FIG. 1 without the lateral displacement of the tip of the nail 16.

Incidentally, in the hitting surface 34q of the lower end of the driver blade 34, since the lower end on the feeder 46 side does not protrude from the lower end on the anti-feeder side, a reaction from the nail 16 at the hitting time acts on the feeder 46 side of the center part 34b of the driver blade 34. Consequently, such a stress that the anti-feeder side extends is applied to the anti-feeder side of the center part 34b of the driver blade 34. Then, due to the influence of this stress, the anti-feeder side of the center part 34b of the driver blade 34 is easily damaged. In addition, as described above, the nail 16 is pressed against the driver blade 34 by the feeder 46 so that the center part 34b of the driver blade 34 is in a state of easily abutting on the inner wall 12a of the injection portion 12.

However, in the driver blade 34 of the present embodiment, even when the above-mentioned stress is applied such that the anti-feeder side of the center part 34b is extended, the outer peripheral surface 34f of the center part 34b on the anti-feeder side is recessed from the outer peripheral surface 34f of the tip part 34a and the root part 34c on the anti-feeder side, so that the outer peripheral surface 34f of the center part 34b and the inner wall 12a of the injection portion 12 can avoid slide at a high speed. That is, it is important to provide the step on the anti-feeder side of the driver blade 34, and this makes it possible to prevent the center part 34b of the driver blade 34 from being damaged. As a result, the durability of the driver blade 34 can be improved.

In addition, in the nail driver 10, at least one of the tip part 34a and the root part 34c abuts on the inner wall 12a of the injection portion 12 at a top dead center position of the hitting portion 13. Further, even at the bottom dead center position, either one of the tip part 34a and the root part 34c abuts on the inner wall 12a of the injection portion 12. For example, in an example of a state in which the hitting portion 13 shown in FIG. 2 reaches the top dead center, the tip part 34a of the driver blade 34 is accommodated in the injection portion 12, and the tip part 34a abuts on the inner wall 12a of the injection portion 12. Therefore, in this state, the center part 34b of the driver blade 34 can avoid abutting on the inner wall 12a of the injection portion 12. Moreover, for example, in an example of a state in which the hitting portion 13 shown by FIG. 7 reaches the bottom dead center, the root part 34c of the driver blade 34 is accommodated in the injection portion 12, and the root part 34c abuts on the inner wall 12a of the injection portion 12. Therefore, even in this state, the center part 34b of the driver blade 34 can avoid abutting on the inner wall 12a of the injection portion 12.

Incidentally, in the example of the state in which the tip part 34a of the driver blade 34 reaches the bottom dead center, the tip part 34a of the driver blade 34 protrudes from the injection portion 12 by a length L. Therefore, by setting, to $L<L1$, a relationship between a protrusion length L from the injection portion 12 of the tip part 34a of the driver blade 34 in the state in which the hitting portion 13 reaches the bottom dead center and a length L1 of the tip part 34a of the driver blade 34 shown in FIG. 3, at least the tip part 34a of the driver blade 34 can be accommodated in the injection portion 12 in the state in which the hitting portion 13 reaches the bottom dead center. This makes it possible to cause the tip part 34a of the driver blade 34 to abut on the inner wall 12a of the injection portion 12 even in the state in which the hitting portion 13 reaches the bottom dead center, and the center part 34b of the driver blade 34 to avoid abutting on the inner wall 12a of the injection portion 12. However, in the state in which the hitting portion 13 reaches the bottom dead center, both the tip part 34a and the root part 34c of the driver blade 34 are preferably accommodated in the injection portion 12 like a state as shown in FIG. 7. This makes it possible for the center part 34b of the driver blade 34 to further avoid abutting on the inner wall 12a of the injection portion 12.

Further, as shown in FIG. 6, the tip part 34a abuts on the inner wall 12a of the injection portion 12 even when the hitting portion 13 is located between the top dead center position and the bottom dead center position. This makes it possible for the inner wall 12a of the injection portion 12 to avoid abutting on the inner wall 12a of the injection portion 12. Incidentally, when the hitting portion 13 is located between the top dead center position and the bottom dead center position, at least one of the tip part 34a and the root part 34c of the driver blade 34 is desirably accommodated inside the injection portion 12.

As described above, in the nail driver 10 of the present embodiment, even when the hitting portion 13 is arranged at the top dead center position, the bottom dead center position, or any position between the top dead center position and the bottom dead center position, at least one of the tip part 34a and the root part 34c of the driver blade 34 is desirably accommodated inside the injection portion 12.

Figure 9A:
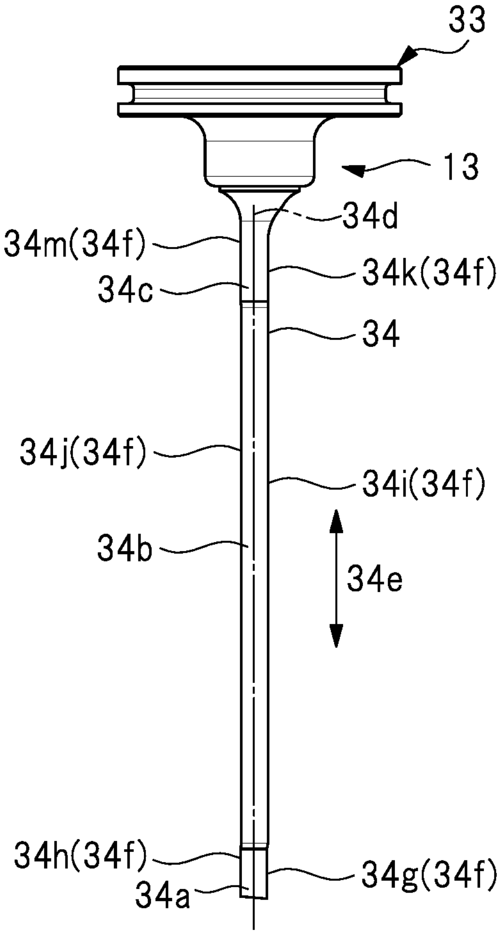
FIGS. 9A-9B are views showing a driver blade of a first modification example in the nail driver of the present invention, wherein 9A is an outline view and 9B is an enlarged view of a tip portion of 9A.
Figure 9B:
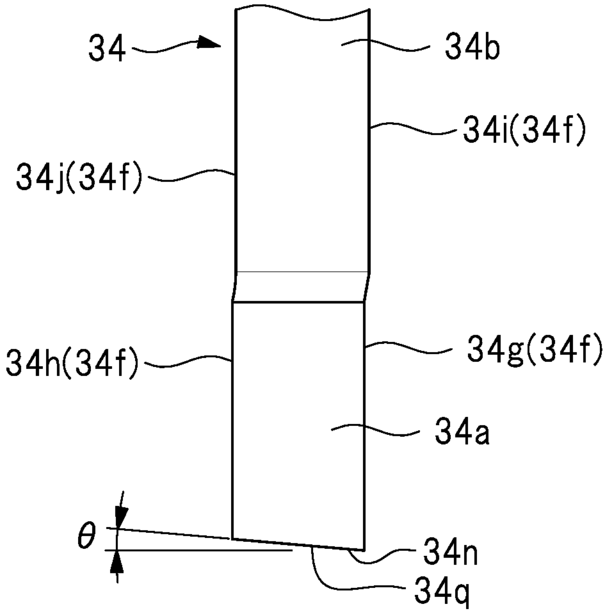

Next, a modification example of the driver blade of the present embodiment will be described. In a driver blade 34 of a first modification example shown in FIGS. 9A-9B, the tip part outer peripheral surface 34h on the anti-feeder side protrudes from the center part outer peripheral surface 34j on the anti-feeder side, and the tip part outer peripheral surface 34g on the feeder 46 side is recessed from the center part outer peripheral surface 34i on the feeder 46 side. As for the outer peripheral surface 34f on the feeder 46 side, if the tip part outer peripheral surface 34g on the feeder 46 side does not protrude from the center part outer peripheral surface 34i of the center part 34b on the feeder 46 side, the tip part 34a and the center part 34b need not be a flat surface having the same height. Even if the tip part outer peripheral surface 34g on the feeder 46 side is recessed from the center part outer peripheral surface 34i on the feeder 46 side as in the first modification example, the diameter of the center part 34b does not become excessively small, so that the damage to the center part 34b can be suppressed.

Figure 10A:
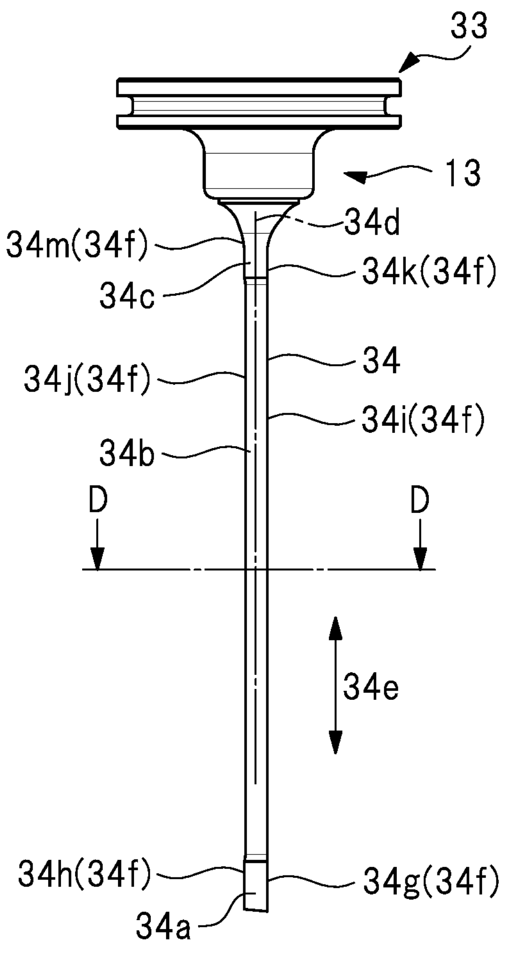
FIGS. 10A-10B are views showing a driver blade of a second modification example in the nail driver of the present invention, wherein 10A is an outline view and 10B is an enlarged view of a tip portion of 10A.
Figure 10B:
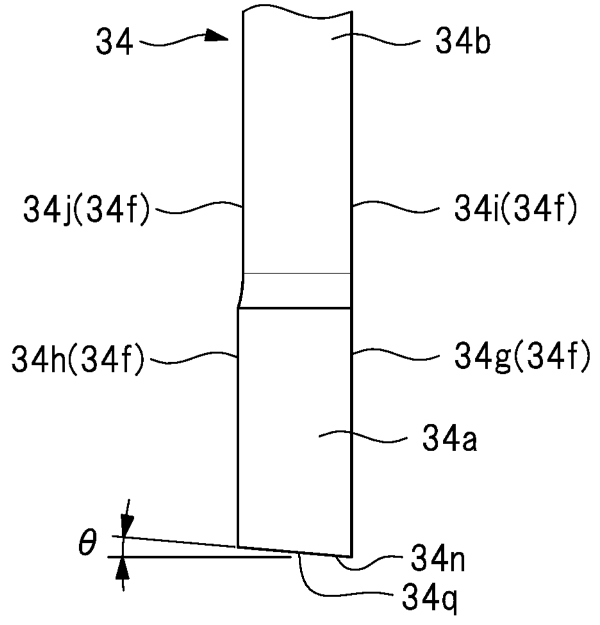
Figure 11A:
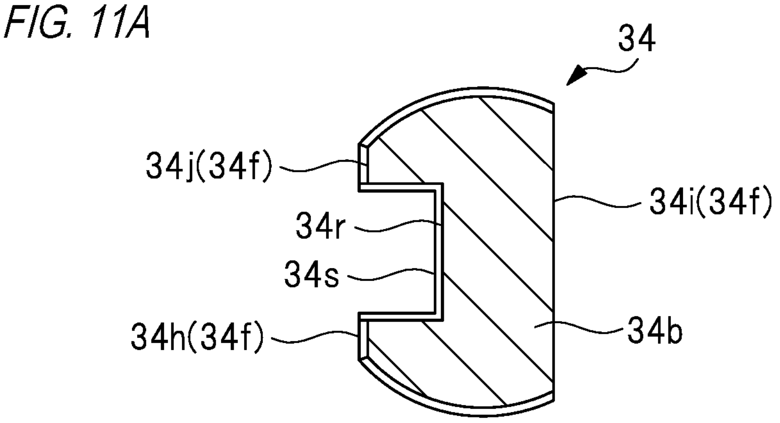
FIGS. 11A-11B are views showing the driver blade shown in FIGS. 10A-10B, wherein 11A is a sectional view taken along line D-D in FIGS. 10A-10B are sectional views showing a relationship with a rail part of an injection portion.
Figure 11B:
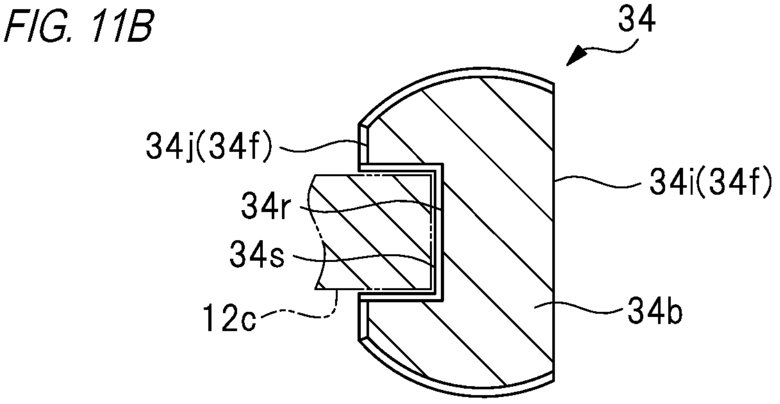

In a driver blade 34 of a second modification example shown in FIGS. 10A-10B, the tip part outer peripheral surface 34*h* on the anti-feeder side protrudes from the center part outer peripheral surface 34*j* on the anti-feeder side and, further, as shown in FIG. 11A, a reverse C-shaped groove portion 34*r* is provided in the center part 34*b* on the anti-feeder side. This groove portion 34*r* is fitted in a rail portion 12*c* that is formed in the injection portion 12 and is shown in FIG. 11B. In other words, by fitting the groove portion 34*r* into the rail portion 12*c* of the injection portion 12, a vertical movement of the driver blade 34 is guided by the rail portion 12*c*. Also in this driver blade 34, by providing a step portion 34*s* in the groove portion 34*r* of the center part 34*b* on the anti-feeder side, the groove portion 34*r* of the center part 34*b* can be prevented from changing in quality due to friction on the rail portion 12*c*. However, even if the groove portion 34*r* of the center part 34*b* changes in quality, a possibility of bringing the damage to the driver blade 34 due to characteristics of an impact at the driving time is little, so that the step portion 34*s* in the groove portion 34*r* may not always be provided.

Figure 12A:
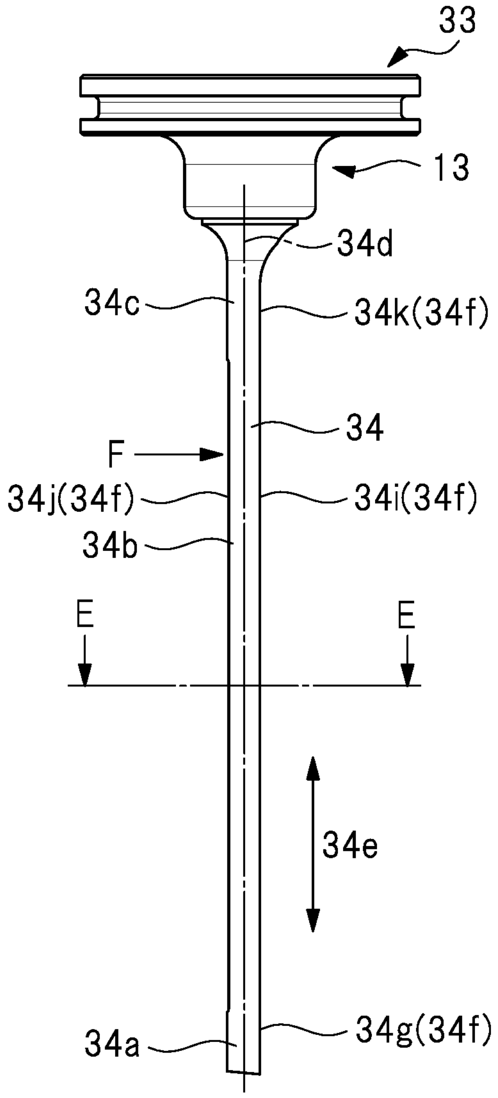
FIGS. 12A-12B are views showing a driver blade of a third modification example in the nail driver of the present invention, wherein 12A is an outline view and 12B is a sectional view taken along line E-E in 12A.
Figure 12B:
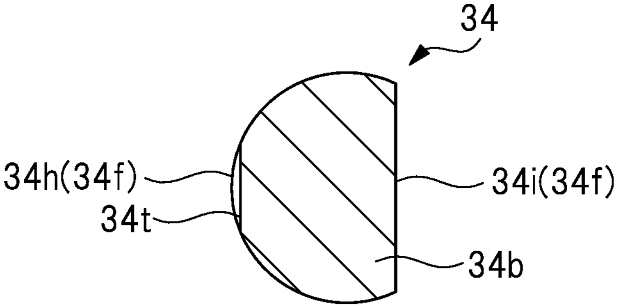
Figure 13A:
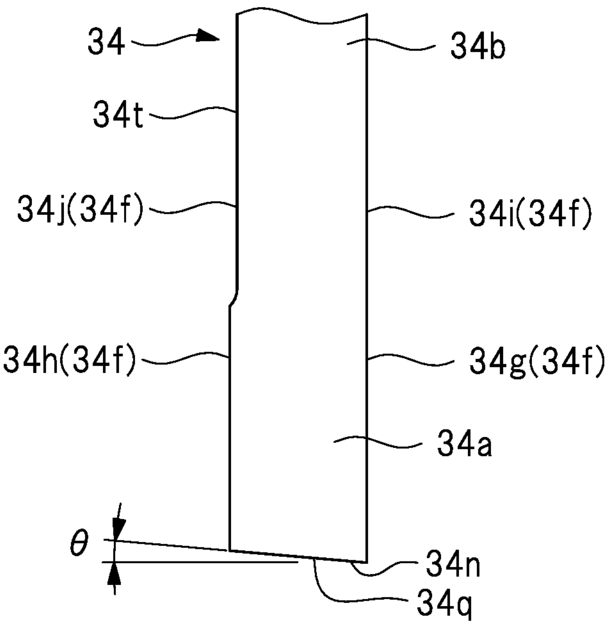
FIGS. 13A-13B are views showing the driver blade shown in FIGS. 12A-12B, wherein 13A is an enlarged view of a tip portion of FIGS. 12A-12B is an F arrow view of FIG. 12A.
Figure 13B:
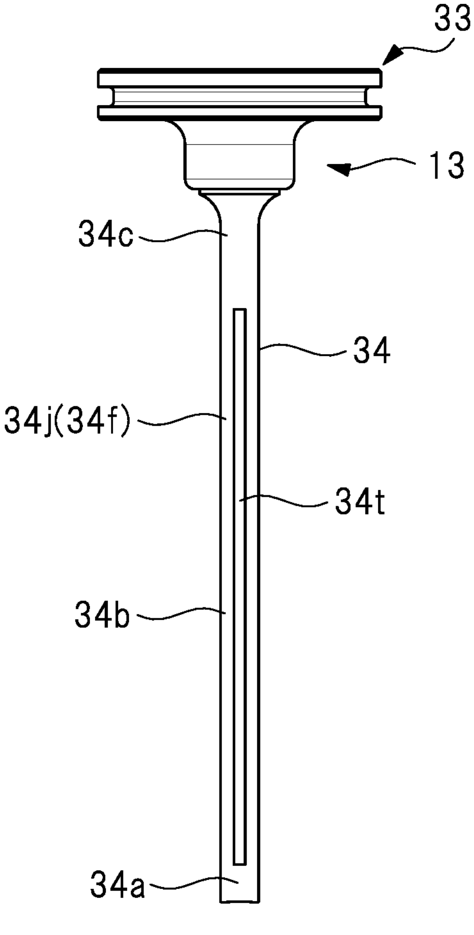

A driver blade 34 of a third modification example shown in FIGS. 12A-12B has a shape in which a concave portion 34*t* is provided on the outer peripheral surface 34*f* of its center part 34*b* on the anti-feeder side. As shown in FIGS. 13A-13B, the concave portion 34*t* is provided so as to be elongated only in the center part 34*b* on the anti-feeder side, and is not provided in the tip part 34*a* and the root part 34*c*. Therefore, the center part outer peripheral surface 34*j* on the anti-feeder side is recessed from the tip part outer peripheral surface 34*h* on the feeder side because the concave portion 34*t* is provided.

Figure 14A:
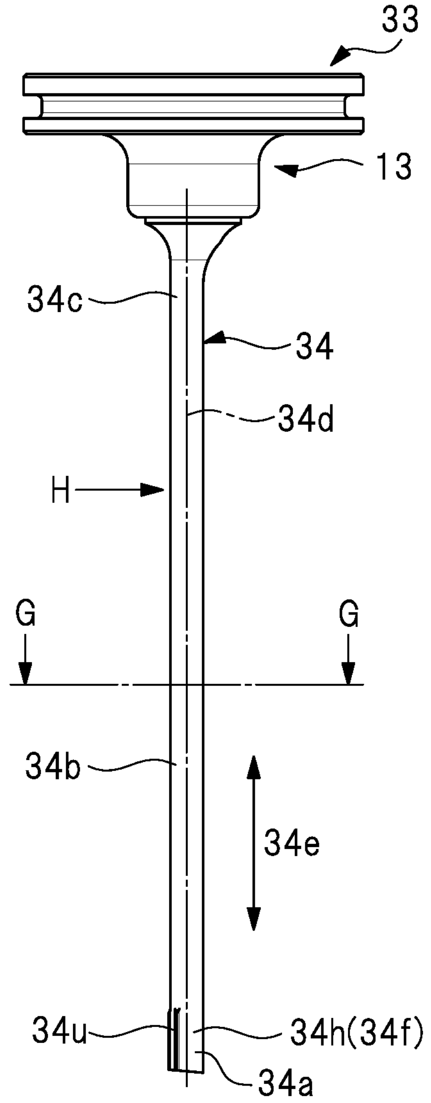
FIGS. 14A-14B are views showing a driver blade of a fourth modification example in a nail driver of the present invention, wherein 14A is an outline view and 14B is a sectional view taken along line G-G in 14A.
Figure 14B:
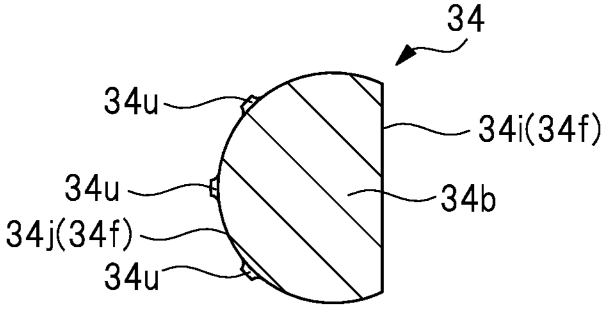
Figure 15A:
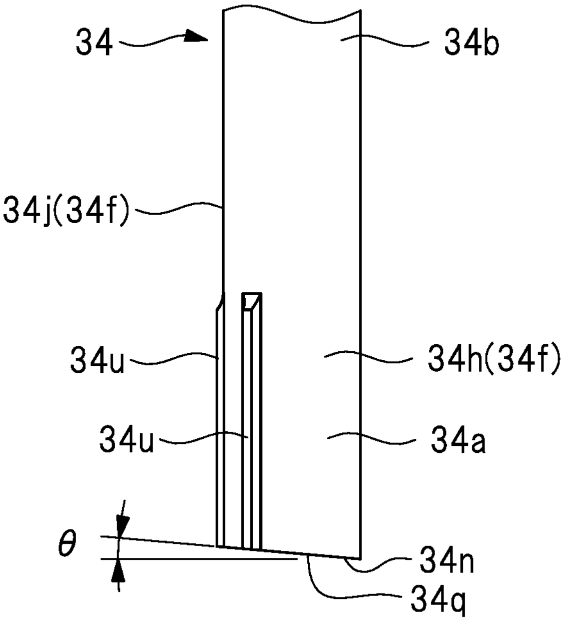
FIGS. 15A-15B are views showing the driver blade shown in FIGS. 14A-14B, wherein 15A is an enlarged view of a tip portion of FIGS. 14A-14B is an H arrow view of FIG. 14A.
Figure 15B:
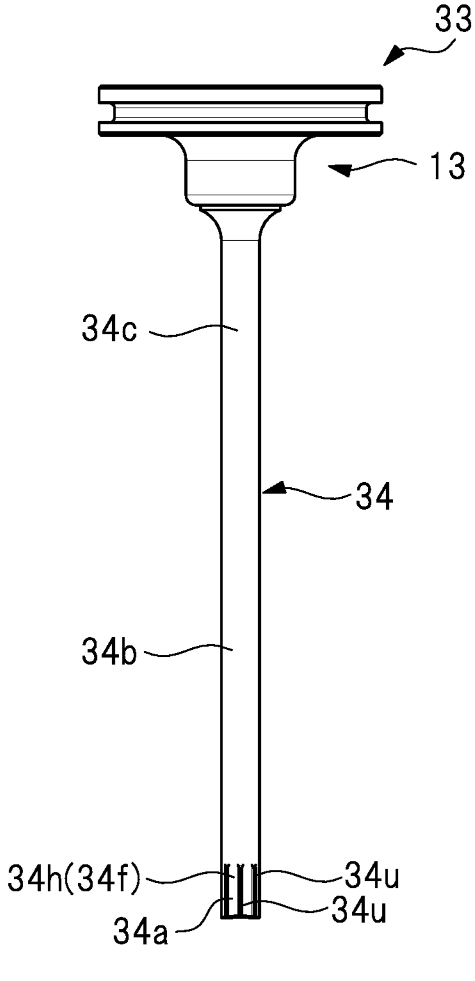

A driver blade 34 of a fourth modification example shown in FIGS. 14A-14B is provided with a plurality of vertical ribs that are formed on the outer peripheral surface 34*f* of its tip part 34*a* on the anti-feeder side so as to be elongated along the axial direction 34*e*. As shown in FIGS. 15A-15B, the vertical ribs 34*u* are provided only on the tip part 34*a* on the anti-feeder side, and are not provided on the center part 34*b* and the root part 34*c* on the anti-feeder side. Consequently, a portion (vertical rib 34*u*) of the tip part 34*a* on the anti-feeder side protrudes from the center part outer peripheral surface 34*j* on the anti-feeder side. Incidentally, the vertical rib 34*u* may also be provided on the root part 34*c*.

Figure 16A:
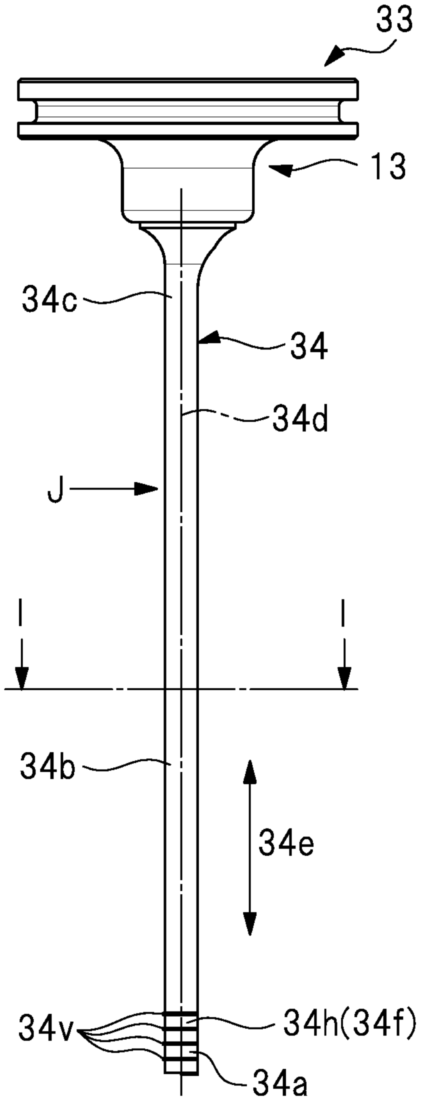
FIGS. 16A-16B are views showing a driver blade of a fifth modification example in the nail driver of the present invention, wherein 16A is an outline view and 16B is a sectional view taken along line I-I in 16A.
Figure 16B:
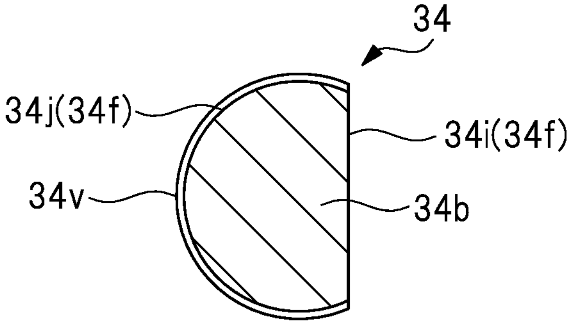
Figure 17A:
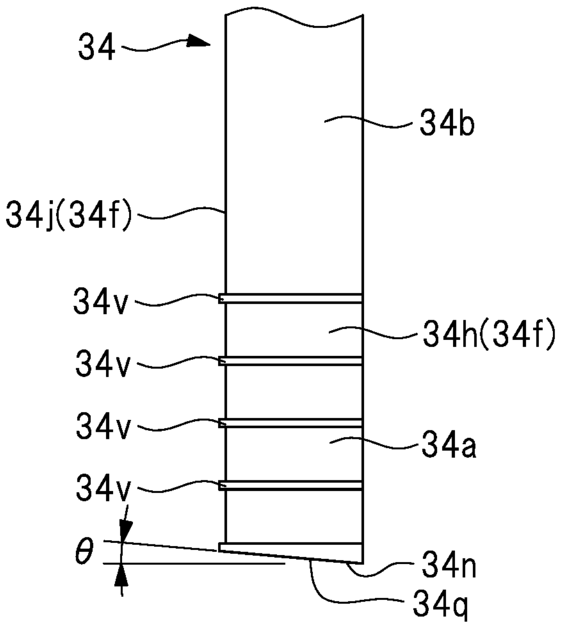
FIGS. 17A-17B are views showing the driver blade shown FIGS. 16A-16B, wherein 17A is an enlarged view of a tip portion of FIGS. 16A-16B is a J arrow view of FIG. 16A.
Figure 17B:
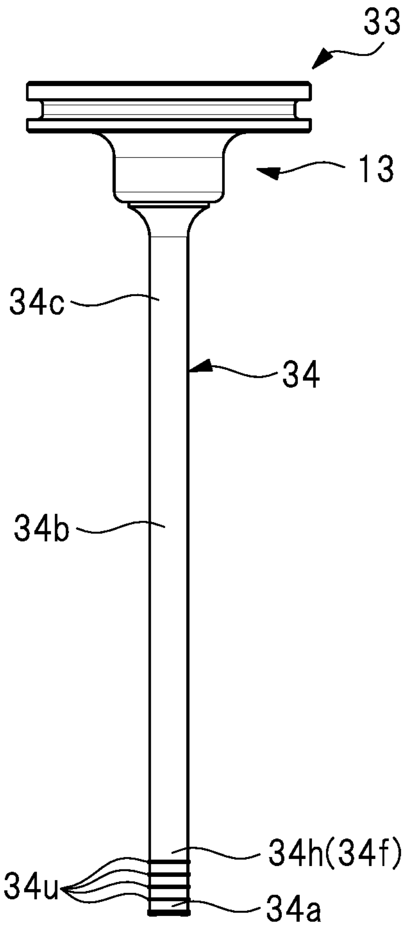

A driver blade 34 of a fifth modification example shown in FIGS. 16A-16B is provided with a plurality of circumferential ribs 34*v* that are formed on an arc-shaped portion of the outer peripheral surface 34*f* of its tip part 34*a* on the anti-feeder side so as to intersect with the axial direction 34*e*. As shown in FIGS. 17A-17B, the circumferential rib 34*v* is provided only on the tip part 34*a*, and is not provided on the center part 34*b* and the root part 34*c*. Consequently, a portion (circumferential rib 34*v*) of the tip part 34*a* on the anti-feeder side protrudes from the center part outer peripheral surface 34*j* on the anti-feeder side. Incidentally, the circumferential rib 34*v* may also be provided on the root part 34*c*.

Figure 18A:
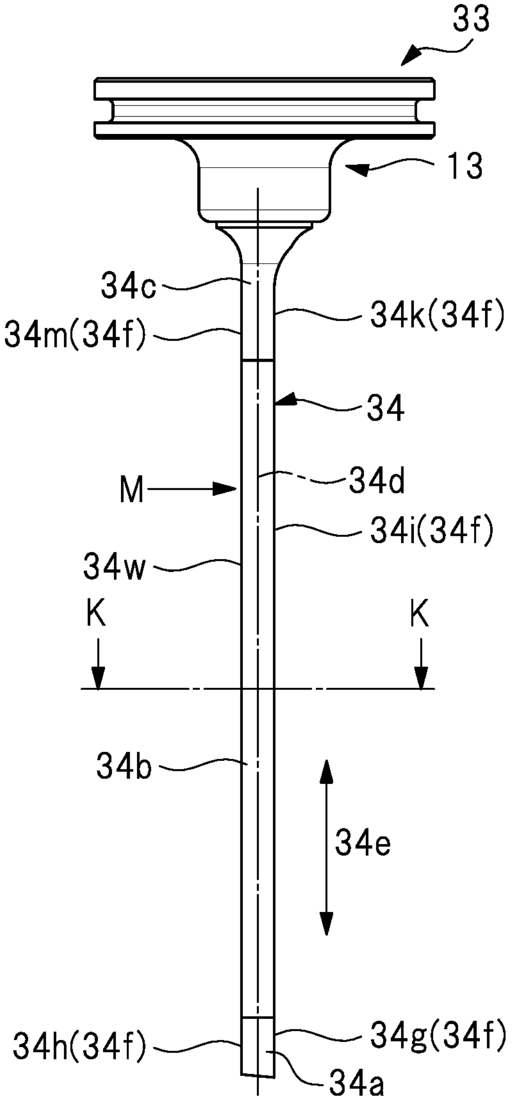
FIGS. 18A-18B are views showing a driver blade of a sixth modification example in the nail driver of the present invention, wherein 18A is an outline view and 18B is a sectional view taken along line K-K in 18A.
Figure 18B:
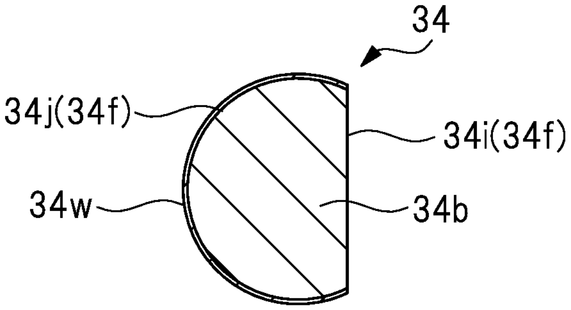
Figure 19A:
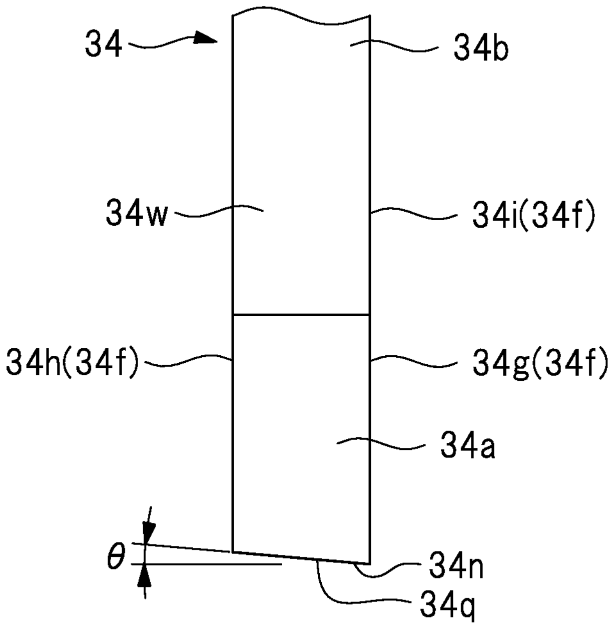
FIGS. 19A-19B are views showing the driver blade shown in FIGS. 18A-18B, wherein 19A is an enlarged view of a tip portion of FIGS. 18A-18B is an M arrow view of FIG. 18A.
Figure 19B:
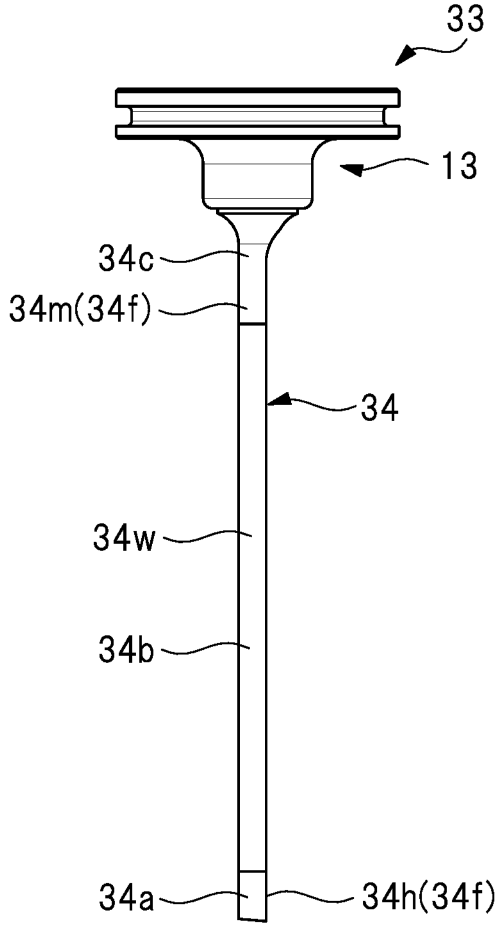

A driver blade 34 of a sixth modification shown in FIGS. 18A-18B has a plated film 34*w* that is formed on an arc-shape portion of the outer peripheral surface 34*f* of the center part 34*b* on the anti-feeder side. As shown in FIGS. 19A-19B, the plated film 34*w* is formed only on the center part 34*b*, and is not formed on the tip part 34*a* and the root part 34*c*. There are two methods for forming such a plated film 34*w*. A first method is a method of: using a base material of the driver blade 34 which is fabricated in the same shape as those of the embodiments shown in FIGS. 3, 4A, 4B, and 4C; forming the plated film 34*w* on the entire surface of the fabricated driver blade 34; and incorporating the plated driver blade into a product. In the first method, when the injection portion 12, the nail 16, and the driver blade 34 slide as nail driving work actually progresses, the plated films 34*w* on the tip part 34*a* and the root part 34*c* are peeled off and the plated film 34*w* of the center part 34*b* only on the anti-feeder side is automatically left. Meanwhile. a second method is a method of: using the same base material fabricated as in the first method; and masking the tip part 34*a* and the root part 34*c* during the plating, thereby forming the plated film 34*w* of the center part 34*b* only on the anti-feeder side.

Incidentally, in the driver blade 34 of the sixth modification example, as shown in FIG. 18B, the center part outer peripheral surface 34*j* on the anti-feeder side in the base material of the driver blade 34 is recessed from the tip part outer peripheral surface 34*h* on the anti-feeder side shown in FIG. 18A. That is, the center part outer peripheral surface 34*j* of the base material of the driver blade 34 on the anti-feeder side is desirably recessed from the tip part outer peripheral surface 34*h* and the root part outer peripheral surface 34*m* of the base material, and the surface of the plated film 34*w* formed on the center part 34*b* may protrude from or recessed from the tip part outer peripheral surface 34*h* and the root part outer peripheral surface 34*m* on the anti-feeder side, or may be a surface having the same height.

As described above, even in the driver blades 34 of the first to sixth modification examples, at least a portion of the outer peripheral surface 34*f* of either the tip part 34*a* or the root part 34*c* on the anti-feeder side protrudes from the outer peripheral surface 34*f* of the center part 34*b* on the anti-feeder side. In other words, the outer peripheral surface 34*f* of the center part 34*b* on the anti-feeder side is recessed from at least a portion of the outer peripheral surface 34*f* of either the tip part 34*a* or the root part 34*c* on the anti-feeder side. This makes it possible for the outer peripheral surface 34 *f* of the center part 34*b* on the anti-feeder side to avoid abutting on the inner wall 12*a* of the injection portion 12.

As a result, the durability of the driver blade 34 can be improved even in the driver blades 34 of the first to sixth modification examples as well.

The present invention is not limited to the above embodiments, and can be modified in various ways without departing from the scope of the invention. For example, the above-described embodiments have explained a case in which: the first part of the driver blade 34 is the tip part 34*a*; the second part is the center part 34*b*; and the first part is located on one side of the axial direction 34*e* (fastener protruding side) relative to the second part. However, the first part and the second part may be at different positions in the axial direction 34*e* of the driver blade 34. Therefore, the first part may be arranged on the other side (opposite side to the fastener protruding side) in the axial direction 34*e* relative to the second part. Even in this case, the same effects as those of the above-mentioned embodiments, that is, the outer peripheral surface 34*f* of the center part 34*b* on the anti-feeder side avoids abutting on the inner wall 12*a* of the injection portion 12, which can improve the durability of the driver blade 34. In addition, regarding the arc-shaped tip part outer peripheral surface 34*h* and the arc-shaped root part outer peripheral surface 34*m*, even if the change in quality occurs, a place where the possibility of the damage to the driver blade 34 is lower by considering the characteristics of the impact at the driving time may not protrude, in other words, only a part in a circumferential direction may be configured so as to protrude from the arc-shaped center part outer peripheral surface 34*j*.

EXPLANATION OF SYMBOLS

10 . . . Nail driver (working machine); 11 . . . Housing; 12 . . . Injection portion; 12*a* . . . Inner wall; 12*b* U groove; 12*c* . . . Rail portion; 13 . . . Hitting portion; 14 . . . Trigger; 15 . . . Push lever; 16 . . . Nail (Fastener); 17 . . . Workpiece: 18 . . . Body part; 19 . . . Handle; . . . Head cover; 21 . . . Plug; 22 . . . Cylinder; 23 . . . Accumulator 24; 24 . . . Passage; 25 . . . Seal member; 26 . . . Exhaust valve chamber; 27 . . . Mount portion; 28 . . . Passage; 29 . . . Passage; 30 . . . Exhaust valve; 31 . . . Valve seat; 32 . . . Piston upper chamber; 33 . . . Piston; 34 . . . Driver blade; 34*a* . . . Tip part (first part)l; 34*b* . . . Center part (second part); 34*c* . . . Root part (third part); 34*d* . . . Axis line; 34*e* . . . Axial direction; 34*f* . . . Outer peripheral surface . . . 34*c*, 34*hg*, 34*h* . . . Tip part outer peripheral surface; 34*i*, 34*j* . . . Center part outer peripheral surface; 34*k*, 34*m* . . . root part outer peripheral surface; 34*n* . . . Lower end surface; 34*p* . . . Taper portion; 34*q* . . . Hitting surface; 34*r* . . . Groove portion; 34*s* . . . Step portion; 34*t* . . . Concave portion; 34*u* . . . Vertical rib; 34*v* . . . Circumferential rib; 34*w* . . . Plated film; 35 . . . Piston lower chamber; 36 . . . Return air chamber; 37, 38 . . . Passage; 39 . . . Bumper; 40 . . . Axial hole; 41 . . . Check valve; 42 . . . Spring; 43 . . . Injection path; 44 . . . Stopper; 45 . . . Magazine; 46 . . . Feeder (supply unit); and 47 . . . Spring.

The invention claimed is:

1. A working machine comprising:

a hitting portion formed in a rod shape that extends about an axis line, and moving to one side in an axial direction to hit a fastener;

an injection portion contacting with an outer peripheral surface of the hitting portion, thereby guiding a movement to the one side of the hitting portion in the axial direction; and a supply portion energizing the fastener on one side in a direction orthogonal to the axial direction, thereby supplying the fastener to the injection portion, wherein the hitting portion has a first part, a second part, and a third part that are provided at positions different from one another in the axial direction, an outer peripheral surface of the first part and the third part on the supply portion side with respect to the axis line does not protrude from the outer peripheral surface of the second part on the supply portion side with respect to the axis line, and at least a part of an outer peripheral surface of the first part and the third part on an opposite side to the supply portion side with respect to the axis line protrudes from the outer peripheral surface of the second part on the opposite side to the supply portion side with respect to the axis line, the second part is located between the first part and the third part, either the first part or the third part abuts on the injection portion at a top dead center position of the hitting portion, and either the first part or the third part abuts on the injection portion at a bottom dead center position of the hitting portion.

2. The working machine according to claim 1, wherein the first part abuts on the injection portion when the hitting portion is located at the top dead center position, at the bottom dead center position, or between the top dead center position and the bottom dead center position.

3. The working machine according to claim 1, wherein a lower end surface of the hitting portion includes a hitting surface that hits the fastener, and the hitting surface is formed with such an inclination with respect to the axis line that the supply portion side protrudes from an opposite side of the supply portion toward the one side in the axial direction.

4. The working machine according to claim 1, wherein shapes of cutting surfaces of the first part and the second part in a direction orthogonal to the axial direction have similar shapes.

5. The working machine according to claim 1, wherein the supply portion presses another fastener against the hitting portion along a direction intersecting with the axial direction in a process in which the hitting portion hits the fastener.

6. The working machine according to claim 1, wherein a protrusion amount of the first part with respect to the second part is 0.05% or more and less than 0.5% with respect to a length of the second part in the axial direction.

* * * * *